(12) United States Patent
Bang et al.

(10) Patent No.: US 8,999,540 B2
(45) Date of Patent: Apr. 7, 2015

(54) BATTERY CELL HOLDER OF IMPROVED CONNECTING RELIABILITY AND BATTERY MODULE EMPLOYED WITH THE SAME

(71) Applicant: LG Chem, Ltd., Seoul (KR)

(72) Inventors: Seung Hyun Bang, Cheongwon-gun (KR); Sooryoung Kim, Cheongwon-gun (KR); Gi Hwan Kwon, Daejeon (KR); Burn Choi, Daejeon (KR); Kyung Min Lee, Yongin-si (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 13/952,111

(22) Filed: Jul. 26, 2013

(65) Prior Publication Data

US 2013/0316202 A1 Nov. 28, 2013

Related U.S. Application Data

(63) Continuation of application No. PCT/KR2012/001515, filed on Feb. 29, 2012.

(30) Foreign Application Priority Data

Mar. 21, 2011 (KR) ........................ 10-2011-0025031

(51) Int. Cl.
*H01M 2/10* (2006.01)
*H01M 2/20* (2006.01)
(Continued)

(52) U.S. Cl.
CPC ............ *H01M 2/1072* (2013.01); *H01M 2/105* (2013.01); *H01M 2/1077* (2013.01);
(Continued)

(58) Field of Classification Search
CPC .... H01M 2/105; H01M 2/1072; H01M 2/204
USPC ................................................ 429/72, 100, 96
See application file for complete search history.

(56) References Cited

U.S. PATENT DOCUMENTS

| | | | |
|---|---|---|---|
| 6,275,003 B1 | 8/2001 | Marukawa et al. | |
| 2001/0046624 A1* | 11/2001 | Goto et al. | 429/99 |

(Continued)

FOREIGN PATENT DOCUMENTS

| | | |
|---|---|---|
| JP | 9-129202 A | 5/1997 |
| JP | 2001-043839 A | 2/2001 |

(Continued)

OTHER PUBLICATIONS

International Search Report issued in PCT/KR2012/001515, mailed on Sep. 7, 2012.

*Primary Examiner* — Jonathan Jelsma
*Assistant Examiner* — Rashid Alam
(74) *Attorney, Agent, or Firm* — Birch, Stewart, Kolasch & Birch, LLP

(57) ABSTRACT

Disclosed is a battery cell holder configured so that a cylindrical battery cell is mounted therein, the battery cell holder including an upper cover including a first main body to cover an upper part of the battery cell in a state in which a first electrode terminal of the battery cell is exposed and at least one first extension fastening part extending downward from the first main body and a lower cover including a second main body to cover a lower part of the battery cell in a state in which a second electrode terminal of the battery cell having a polarity opposite to that of the first electrode terminal is exposed and at least one second extension fastening part extending upward from the second main body.

25 Claims, 8 Drawing Sheets

(51) Int. Cl.
*H01M 10/613* (2014.01)
*H01M 10/625* (2014.01)
*H01M 10/643* (2014.01)
*H01M 10/6557* (2014.01)

(52) U.S. Cl.
CPC .......... *H01M2/206* (2013.01); *H01M 10/5004* (2013.01); *H01M 10/5016* (2013.01); *H01M 10/503* (2013.01); *H01M 10/5059* (2013.01); *H01M 2220/20* (2013.01)

(56) References Cited

U.S. PATENT DOCUMENTS

| | | |
|---|---|---|
| 2008/0286639 A1 | 11/2008 | Yusa et al. |
| 2008/0314792 A1 | 12/2008 | Daeschler et al. |
| 2009/0111015 A1 | 4/2009 | Wood et al. |
| 2009/0214940 A1 | 8/2009 | Haussmann |
| 2009/0233157 A1* | 9/2009 | Kim ................. 429/53 |
| 2009/0233163 A1* | 9/2009 | Fang et al. ............ 429/99 |
| 2010/0047676 A1 | 2/2010 | Park et al. |
| 2011/0039142 A1* | 2/2011 | Kwag et al. ............ 429/99 |

FOREIGN PATENT DOCUMENTS

| | | |
|---|---|---|
| JP | 2001-057196 A | 2/2001 |
| JP | 2001-110379 A | 4/2001 |
| JP | 3144501 U | 9/2008 |
| JP | 2008-287993 A | 11/2008 |
| KR | 10-2008-0013040 A | 2/2008 |
| KR | 10-2009-0000301 A | 1/2009 |

* cited by examiner

BATTERY CELL HOLDER OF IMPROVED CONNECTING RELIABILITY AND BATTERY MODULE EMPLOYED WITH THE SAME

CROSS REFERENCE TO RELATED APPLICATIONS

This application is a Bypass Continuation of PCT International Application No. PCT/KR2012/001515 filed on Feb. 29, 2012, which claims priority under 35 U.S.C §119(a) to Patent Application No. 10-2011-0025031 filed in the Republic of Korea on Mar. 21, 2011, all of which are hereby expressly incorporated by reference into the present application.

TECHNICAL FIELD

The present invention relates to a battery cell holder with improved connection reliability and a battery module including the same, and, more particularly, to a battery cell holder configured so that a cylindrical battery cell is mounted therein, the battery cell holder including an upper cover including a first main body to cover an upper part of the battery cell in a state in which a first electrode terminal of the battery cell is exposed and at least one first extension fastening part extending downward from the first main body and a lower cover including a second main body to cover a lower part of the battery cell in a state in which a second electrode terminal of the battery cell having a polarity opposite to that of the first electrode terminal is exposed and at least one second extension fastening part extending upward from the second main body, wherein an end of the at least one first extension fastening part and an end of the at least one second extension fastening part are fastened to each other in a state in which the battery cell is mounted in the battery cell holder, and the upper cover and/or the lower cover is provided at an outer side thereof with at least one side fastening part, by which a side of the battery cell holder is fastened to that of another battery cell holder.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

Therefore, the secondary battery is being applied to an increasing number of applications owing to advantages thereof, and, in the future, the secondary battery is expected to be applied to even more applications and products.

Small-sized mobile devices use one or several battery cells for each device. On the other hand, middle or large-sized devices, such as vehicles, use a middle or large-sized battery module having a plurality of battery cells electrically connected to each other because high power and capacity are necessary for the middle or large-sized devices.

The size and weight of the battery module is directly related to the receiving space and power of the corresponding middle- or large-sized device. For this reason, manufacturers are trying to manufacture small-sized, light-weight battery modules. Furthermore, devices, such as electric bicycles and electric vehicles, which are subject to a large number of external impacts and vibrations, require stable electrical connection and physical coupling between components constituting the battery module. In addition, a plurality of battery cells are used to accomplish high power and capacity, and therefore, the safety of the battery module is regarded as important.

Preferably, the middle or large-sized battery module is manufactured so as to have as small a size and weight as possible. For this reason, a prismatic lithium polymer battery or a pouch-shaped lithium polymer battery, which can be stacked with high integration and has a small weight to capacity ratio, is usually used as a battery cell of the middle or large-sized battery module.

However, the lithium polymer battery is relatively expensive due to a complicated manufacturing process thereof and exhibits relatively low use properties at a low temperature. Also, application of the lithium polymer battery to products having various sizes is limited. For this reason, the use of a cylindrical lithium ion battery has been attempted in recent years.

The cylindrical battery has great difficulty in maintaining arrangement as a stacked structure due to the appearance characteristics thereof although the cylindrical battery has a higher electric capacity than the prismatic battery or the pouch-shaped battery. For this reason, the use of additional fixing members is necessary for the cylindrical battery. For example, there has been normally used a method of arranging cylindrical batteries and fixing the cylindrical batteries with a fixing tape or coating cylindrical batteries with plastic so as to maintain the arrangement structure of the cylindrical batteries. According to circumstances, a double-sided adhesive tape may be attached between the cylindrical batteries so as to further increase coupling force between the cylindrical batteries.

However, the strength of the fixing tape and the plastic coating is small, and therefore, the fixing tape and the plastic coating may be easily damaged or broken. Consequently, the fixing tape and the plastic coating are not suitable for stably maintaining the arrangement structure of the batteries.

Furthermore, it is required for a battery module to have various outputs and capacities by adjusting the number batteries connected with each other depending upon the specification of a device in which the battery module is used. In the cylindrical batteries, however, a fixing member for maintaining the arrangement structure of the cylindrical batteries is requisite. Consequently, there is a problem that various kinds of fixing members must be manufactured depending upon the number of cylindrical batteries to be assembled when a battery module is constituted by the cylindrical batteries. In order to solve this problem, a unit fixing member may be manufactured such that one or two batteries can mounted to the unit fixing member, and a plurality of unit fixing members may be connected with each other to constitute a battery pack. In this case, however, it is necessary that the unit fixing members be coupled with each other depending upon desired output and capacity of the battery pack.

Consequently, the necessity of a technology for fundamentally solving the above-mentioned problem is very high.

DISCLOSURE

Technical Problem

Therefore, the present invention has been made to solve the above problems and other technical problems that have yet to be resolved.

Specifically, it is an object of the present invention to provide a battery cell holder which is easily assembled and exhibits improved insulation, thereby preventing the occurrence of a short circuit between batteries.

It is another object of the present invention to provide a battery module including a battery cell holder, whereby structural stability of the battery module is improved, wherein mechanical fastening between unit modules is possible depending upon required capacity of the battery module, whereby capacity and output of the battery module is easily controlled, and heat generated from batteries during charge and discharge of the batteries is effectively removed.

Technical Solution

In accordance with one aspect of the present invention, the above and other objects can be accomplished by the provision of a battery cell holder configured so that a cylindrical battery cell is mounted therein, the battery cell holder including an upper cover including a first main body to cover an upper part of the battery cell in a state in which a first electrode terminal of the battery cell is exposed and at least one first extension fastening part extending downward from the first main body and a lower cover including a second main body to cover a lower part of the battery cell in a state in which a second electrode terminal of the battery cell having a polarity opposite to that of the first electrode terminal is exposed and at least one second extension fastening part extending upward from the second main body, wherein an end of the at least one first extension fastening part and an end of the at least one second extension fastening part are fastened to each other in a state in which the battery cell is mounted in the battery cell holder, and the upper cover and/or the lower cover is provided at an outer side thereof with at least one side fastening part, by which a side of the battery cell holder is fastened to that of another battery cell holder.

In the battery cell holder according to the present invention, the first main body and/or the second main body may be configured to have an inner structure corresponding to, for example, an outer shape of the cylindrical battery cell. Preferably, the first main body and the second main body have a length equivalent to 10 to 40% of that of the cylindrical battery cell. Consequently, the cylindrical battery cell can be stably mounted in the first main body and the second main body.

In a preferred example, the first main body may be provided at an upper end thereof with an opening, through which the corresponding first electrode terminal of the battery cell is exposed, the second main body may be provided at a lower end thereof with an opening, through which the corresponding second electrode terminal of the battery cell is exposed, and each of the openings may have an outer circumferential part protruding from the corresponding first electrode terminal or the corresponding second electrode terminal by a predetermined thickness.

Generally, a cathode terminal is formed at the center of the upper end of a cylindrical battery cell in a protruding state, and the outer circumference of the upper end of the cylindrical battery cell constitutes an anode terminal. When external impact is applied to battery cells, therefore, coupling between the electrode terminals and electrode terminal connection members may be released, and/or the connection members or the battery cells may be out of position, with the result that electrode breakage or a short circuit may occur.

In the battery cell holder according to the present invention, on the other hand, the outer circumferential part of the opening protrudes by the predetermined thickness. Even when external impact is applied to battery cells or the battery cells are deformed due to various causes, therefore, the battery cell holder forms an insulation structure between electrode terminal connection members and the battery cells, thereby preventing the occurrence of electrode breakage or a short circuit and improving overall structural stability of a battery module.

Specifically, each of the openings may be circular in a planar shape so that each of the openings corresponds to the shape of a corresponding one of the electrode terminals.

Also, the outer circumferential part of each of the openings may have a thickness of 0.1 to 1 mm. If the thickness is too small, the above-mentioned insulation structure may not properly function. If the thickness is too large, on the other hand, coupling between the electrode terminals and the connection members may not be easily achieved. Consequently, too small thickness and too large thickness are not preferable.

Meanwhile, the at least one first extension fastening part may include two or more first extension fastening parts symmetric with respect to a central axis of the battery cell holder, and the at least one second extension fastening part may include two or more second extension fastening parts symmetric with respect to the central axis of the battery cell holder, thereby more securely achieving fastening between the upper cover and the lower cover.

In this case, the at least one first extension fastening part preferably includes even-numbered first extension fastening parts, and the at least one second extension fastening part preferably includes even-numbered second extension fastening parts.

In a preferred example, one (for example, the first extension fastening part) of the first and second extension fastening parts may have a coupling protrusion, and the other (for example, the second extension fastening part) of the first and second extension fastening parts may have a coupling groove corresponding to the coupling protrusion.

In the above structure, the fastening protrusion is preferably fastened into the fastening groove in a forced fitting fashion. That is, the extension fastening parts may be formed of an extensible material, and the fastening protrusion may have an outer diameter greater than an inner diameter of the fastening groove. During fastening between the fastening protrusion and the fastening groove, therefore, the inner diameter of the fastening groove may be elastically extended to the outer diameter of the fastening protrusion. As a result, the fastening protrusion may be elastically fastened into the fastening groove.

Meanwhile, the at least one side fastening part may be configured to have a sliding fastening type groove structure formed in the longitudinal direction of the battery cell holder.

Specifically, the sliding fastening type groove structure may include a hook and a depressed groove corresponding to the hook in a sectional shape perpendicular to the longitudinal direction, and the depressed groove may be formed inside at a bent portion of the hook. During fastening between the battery cell holder and another battery holder, therefore, the hooks formed at the respective side fastening parts are coupled to each other in a sliding fastening fashion, thereby achieving mechanical connection therebetween. Consequently, an overall assembly process is very easy and simple.

Also, when each of the extension fastening parts includes quadruple-numbered extension fastening parts, the bent portions of the hooks may be alternately arranged by two units.

Specifically, when the bent portions of the hooks at a pair of extension fastening parts are inwardly directed to each other, the bent portions of the hooks at neighboring extension fastening parts may be outwardly directed from each other. Consequently, the extension fastening parts of the neighboring battery cell holders are fastened to each other in an engagement fashion, thereby improving structural stability therebetween and increasing fastening strength at the coupling regions thereof.

Meanwhile, the side fastening parts may be formed at the upper cover and the lower cover at opposite sides of an imaginary extension line of the extension fastening parts. Consequently, it is possible to effectively connect battery cells adjacent to each other in a tight contact state.

In accordance with another aspect of the present invention, there is provided a unit module including the battery cell holder with the above-stated construction and a cylindrical battery cell mounted in the battery cell holder.

In accordance with another aspect of the present invention, there is provided a battery module including two or more unit modules, each of which is configured as described above, and at least one connection member to electrically connect the unit modules to each other.

In a preferred example, the battery module may be configured to have a structure in which the unit modules are arranged in at least two rows and/or in at least two columns. That is, it is possible to easily adjust the number of batteries to be connected to each other based on the specification of a device, in which the battery module is used.

In another preferred example, the battery module may have a coolant flow channel formed among neighboring unit modules at a space defined between side fastening parts in the longitudinal direction of battery cells. That is, the coolant flow channel is continuously formed at fastened regions of the adjacent side fastening parts, and therefore, it is possible to improve cooling efficiency without provision of an additional coolant system.

Also, the battery module may have a coolant flow channel formed among neighboring unit modules at a space defined between extension fastening parts in the lateral direction of the battery cells.

In the above structure, when a plurality of unit cells is connected to each other using the battery cell holder according to the present invention, it is possible to effectively remove heat generated from the unit cells during charge and discharge of the unit cells or during operation of the unit cells.

In a concrete example, the battery module may be configured to have a structure in which the unit modules are arranged in a matrix of 5×5, in which electrode terminals having the same polarity may be arranged in the column direction (vertical direction), and electrode terminals having different polarities may be arranged in the row direction (horizontal direction).

In the above structure, the at least one connection member may be configured in various forms. Preferably, the at least one connection member is formed of a conductive plate.

In a preferred example, the at least one connection member may include a first connection member to electrically connect a first column of the unit modules to one another at the front of the battery module, a second connection member to electrically connect a second column and a third column of the unit modules to one another at the front of the battery module, the second connection member having at least one extension extending in a row direction, and a third connection member to electrically connect a fourth column and a fifth column of the unit modules to one another at the front of the battery module, the third connection member having at least one extension extending in the row direction.

The at least one connection member is used to electrically connect the electrode terminals to each other. According to circumstances, a voltage detection terminal may be further needed. Consequently, the at least one connection member may include a voltage detection terminal bent in the lateral direction of the unit modules.

Also, a conductive wire may be connected to the conductive plate to constitute an external input and output terminal.

In accordance with a further aspect of the present invention, there is provided a device including the battery module with the above-stated construction as a power source. In particular, the device may be an electric vehicle, a hybrid electric vehicle, a plug-in hybrid electric vehicle, an electric motorcycle, or a power storage device, which requires long lifespan and excellent durability.

Advantageous Effects

As is apparent from the above description, the battery cell holder according to the present invention has the effects in that it is possible to manufacture a battery module which is structurally stable, to easily assemble the battery cell holder, to prevent the occurrence of a short circuit during assembly or use of the battery module, and to effectively remove heat generated from unit cells during charge and discharge of the unit cells.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
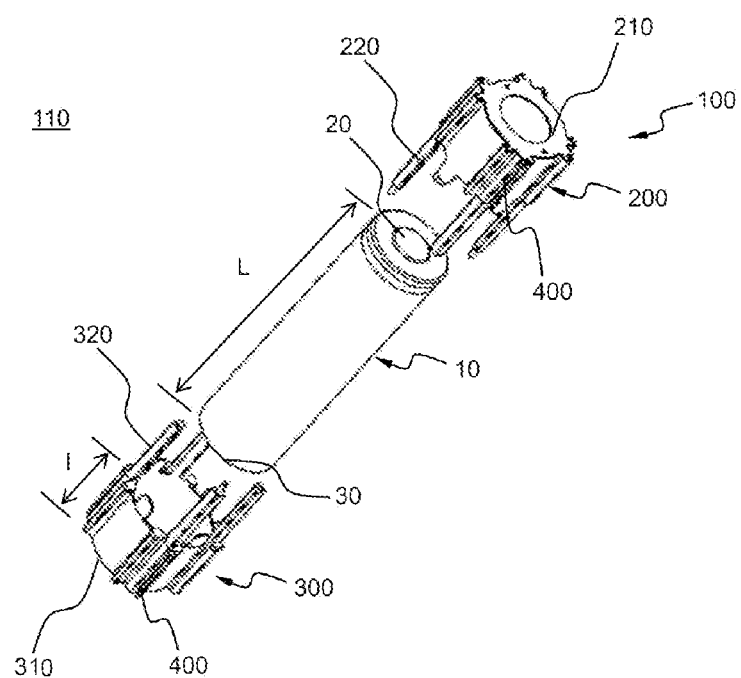
FIG. 1 is an exploded view showing a unit module according to an embodiment of the present invention.
Figure 2:
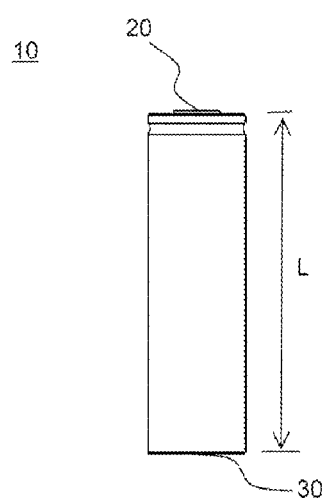
FIG. 2 is a front view of a battery cell shown in FIG. 1.

FIG. 1 is an exploded view typically showing a unit module according to an embodiment of the present invention, and FIG. 2 is a front view typically showing a battery cell shown in FIG. 1.

Referring to these drawings, a unit module 110 includes a battery cell holder 100 and a cylindrical battery cell 10 mounted in the battery cell holder 100. The battery cell holder 100 includes an upper cover 200 and a lower cover 300.

The upper cover 200 includes a first main body 210 to cover the upper part of the battery cell in a state in which at least a portion of a cathode terminal 20 of the cylindrical battery cell 10 is exposed and four first extension fastening parts 220 extending downward from the first main body 210.

The lower cover 300 includes a second main body 310 to cover the lower part of the battery cell in a state in which at least a portion of an anode terminal 30 of the cylindrical battery cell 10 is exposed and four second extension fastening parts 320 extending upward from the second main body 310.

The end of each of the first extension fastening parts 220 and the end of a corresponding one of the second extension fastening parts 320 are fastened to each other in a state in which the cylindrical battery cell 10 is mounted in the battery cell holder 100. The upper cover 200 is provided at the outer side thereof with side fastening parts 400, by which the side of the battery cell holder 100 is fastened to those of other battery cell holders (not shown). In the same manner, the lower cover 300 is provided at the outer side thereof with side fastening parts 400, by which the side of the battery cell holder 100 is fastened to those of other battery cell holders (not shown).

The first main body 210 and the second main body 310 are configured to have an inner structure corresponding to the outer shape of the cylindrical battery cell 10. The first main body 210 and the second main body 310 have a length l equivalent to about 20% of the length L of the cylindrical battery cell 10.

Figure 3:
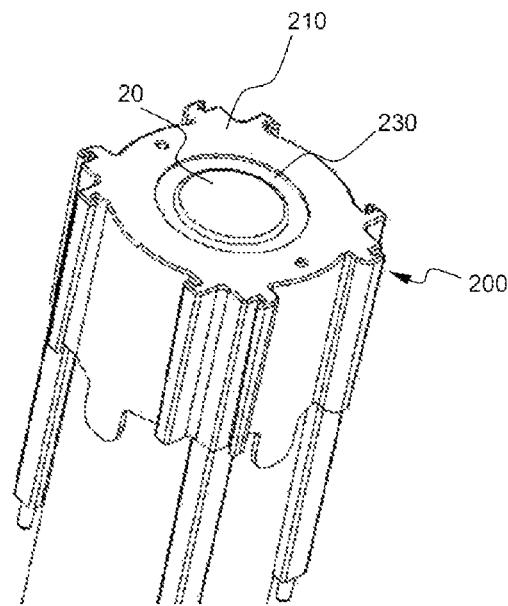
FIG. 3 is a perspective view of an upper cover shown in FIG. 1.
Figure 4:
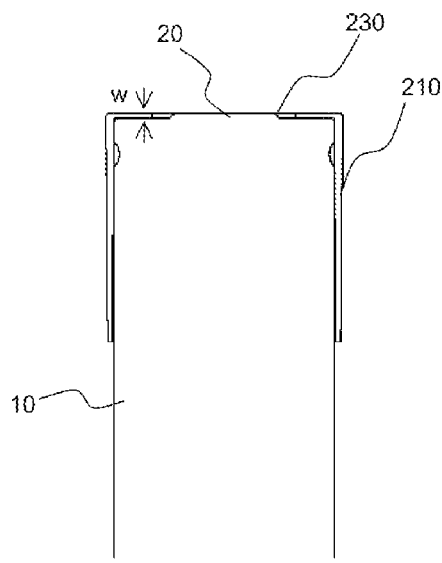
FIG. 4 is a partial front view of the upper cover mounted to the battery cell shown in FIG. 1.
Figure 5:
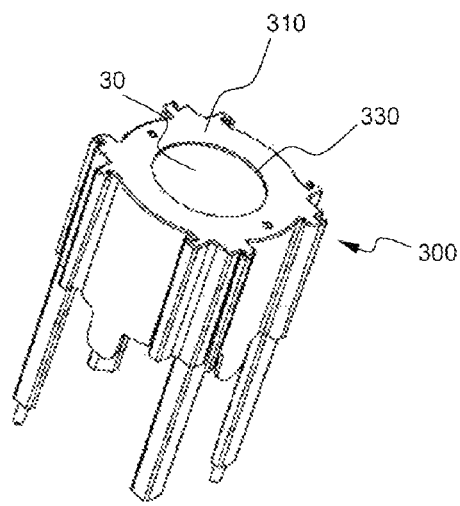
FIG. 5 is a perspective view of a lower cover shown in FIG. 1.

FIG. 3 is a perspective view typically showing the upper cover shown in FIG. 1, FIG. 4 is a partial front view of the upper cover mounted to the battery cell shown in FIG. 1, and FIG. 5 is a perspective view typically showing the lower cover shown in FIG. 1.

Referring to these drawings together with FIGS. 1 and 2, the first main body 210 is provided at the upper end thereof with an opening 230, which is circular in a planar shape, through which the corresponding cathode terminal 20 of the cylindrical battery cell 10 is at least partially exposed. In the same manner, the second main body 310 is provided at the lower end thereof with an opening 330, which is circular in a planar shape, through which the corresponding anode terminal 30 of the cylindrical battery cell 10 is at least partially exposed.

The opening 230 has an outer circumferential part protruding from the cathode terminal 20 by a thickness w of about 0.5 mm. In the same manner, the opening 330 has an outer circumferential part protruding from the anode terminal 30 by a thickness w of about 0.5 mm. Consequently, an insulation structure is formed between a connection member and battery cells, thereby preventing the occurrence of electrode breakage or a short circuit and improving structural stability therebetween.

Figure 6:
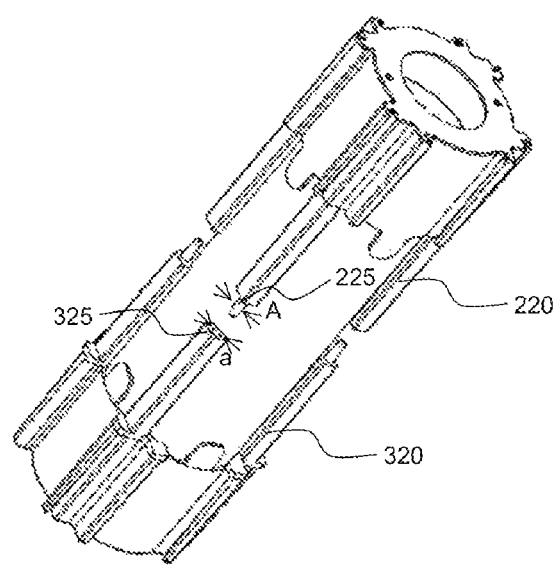
FIG. 6 is an exploded view of a battery cell holder shown in FIG. 1.
Figure 7:
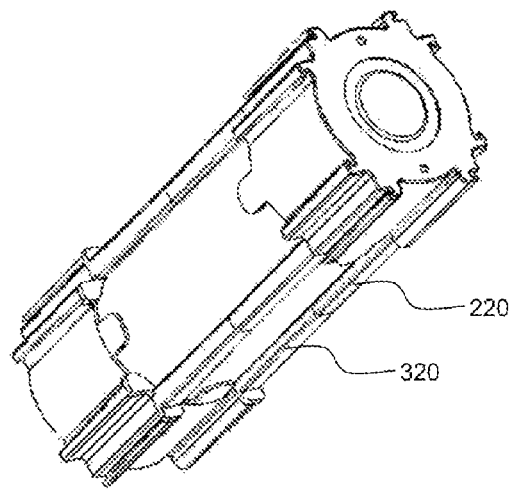
FIG. 7 is an assembled view of the battery cell holder shown in FIG. 6.

FIG. 6 is an exploded view typically showing the battery cell holder shown in FIG. 1, and FIG. 7 is an assembled view typically showing the battery cell holder shown in FIG. 6.

Referring to these drawings together with FIG. 1, fastening protrusion 225 and fastening grooves 325 are alternately formed at the first extension fastening parts 220. In the same manner, fastening protrusion 225 and fastening grooves 325 are alternately formed at the second extension fastening parts 320. The fastening grooves 325 correspond to the fastening protrusion 225.

The extension fastening parts 220 and 320 are formed of an extensible material, and each of the fastening protrusions 225 has an outer diameter A slightly greater than an inner diameter a of a corresponding one of the fastening grooves 325. During fastening between the fastening protrusions 225 and the fastening grooves 325, therefore, the inner diameter a of each of the fastening grooves 325 is elastically extended to the outer diameter A of a corresponding one of the fastening protrusions 225. As a result, each of the fastening protrusions 225 are fastened into a corresponding one of the fastening grooves 325 in a forced fitting fashion.

Figure 8:
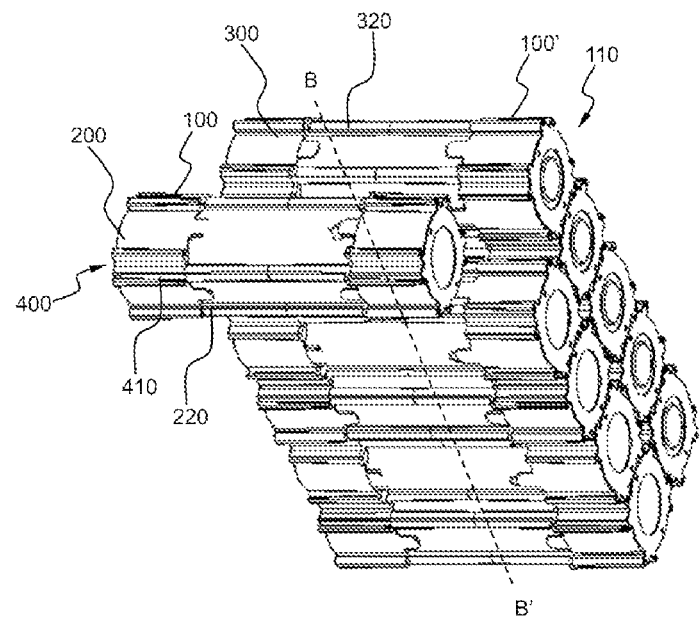
FIG. 8 is a typical view showing a state in which unit modules according to another embodiment of the present invention are fastened to one another in a sliding fastening fashion.
Figure 9:
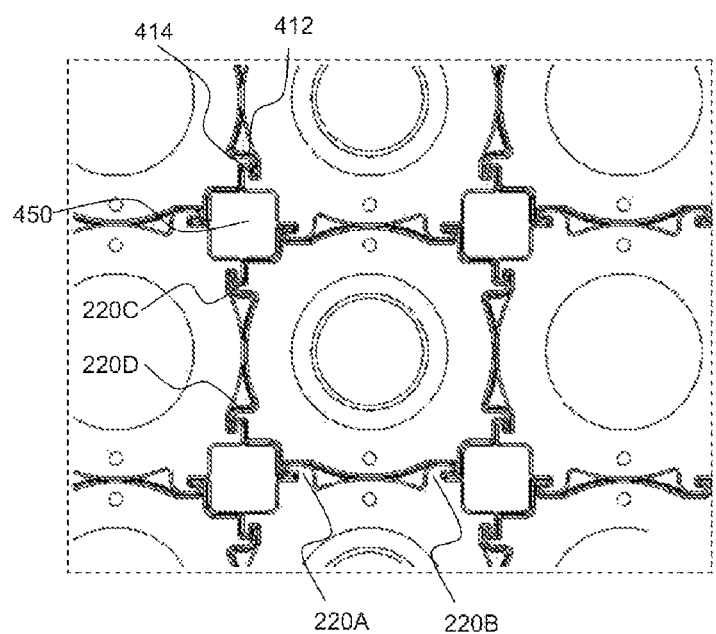
FIG. 9 is a partially enlarged front view of FIG. 8.
Figure 10:
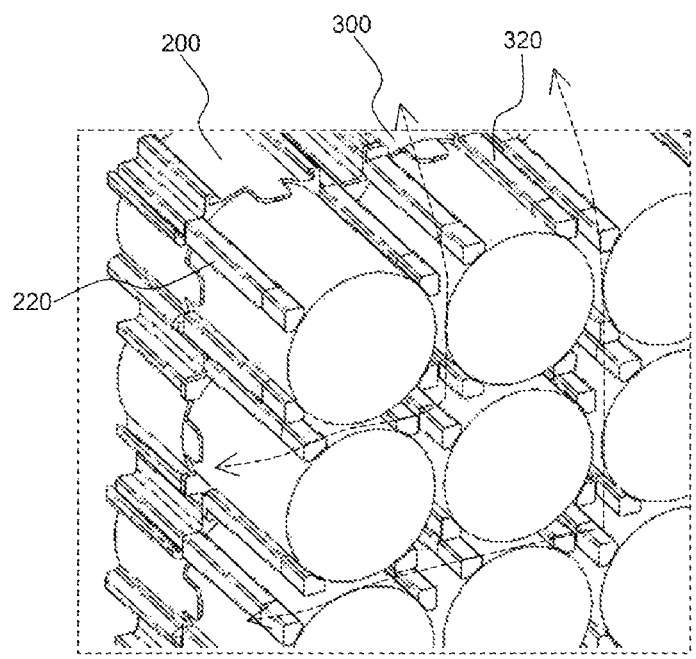
FIG. 10 is a typical sectional view taken along line B-B' of FIG. 8.

FIG. 8 is a typical view showing a state in which unit modules according to another embodiment of the present invention are fastened to one another in a sliding fastening fashion, FIG. 9 is a partially enlarged front view of FIG. 8, and FIG. 10 is a typical sectional view taken along line B-B' of FIG. 8.

Referring to these drawings together with FIG. 1, each of the side fastening parts 400 is configured to have a sliding fastening type groove structure 410 formed in the longitudinal direction L of the battery cell holder 100.

As shown in FIG. 9, the sliding fastening type groove structure 410 includes a hook 412 and a depressed groove 414 corresponding to the hook 412. The depressed groove 414 is formed inside a bent portion of the hook 412.

During fastening between the battery cell holder 100 and another battery holder 100', therefore, the hooks 412 formed at the respective side fastening parts 400 are coupled to each other in a sliding fastening fashion, thereby achieving mechanical connection therebetween. Consequently, an overall assembly process is very easy and simple.

In the four first extension fastening parts 220, the bent portions of the hooks 420 are alternately arranged two by two. Specifically, when the bent portions of the hooks 420 at a pair of first extension fastening parts 220A and 220B are inwardly directed to each other, the bent portions of the hooks 420 at neighboring first extension fastening parts 220C and 220D are outwardly directed from each other. Consequently, the extension fastening parts of the neighboring battery cell holders are fastened to each other in an engagement fashion, thereby improving structural stability therebetween and increasing fastening strength at the coupling regions thereof.

Meanwhile, the side fastening parts 400 are formed at the upper cover 200 and the lower cover 300 at opposite sides of imaginary extension lines of the first extension fastening parts 220 and the second extension fastening parts 320. Consequently, it is possible to effectively connect battery cells adjacent to each other in a tight contact state.

Also, a coolant flow channel 450 is formed among neighboring unit modules 110 at a space defined between the side fastening parts 400 in the longitudinal direction L of each of the battery cells 100, and a coolant flow channel is formed (see arrows) among neighboring unit modules 110 at a space defined between the extension fastening parts 220 and 320 in the lateral direction B-B' of the battery cells. When a plurality of unit cells is connected to each other, therefore, it is possible to effectively remove heat generated from the unit cells during charge and discharge of the unit cells or during operation of the unit cells without provision of an additional coolant system.

Figure 11:
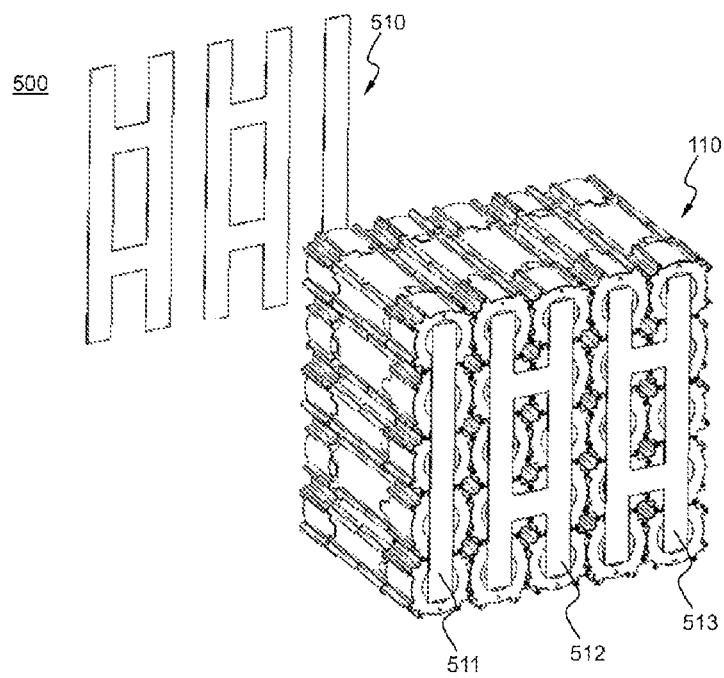
FIG. 11 is a typical view showing a battery module according to another embodiment of the present invention.

FIG. 11 is a typical view showing a battery module according to another embodiment of the present invention.

Referring to FIG. 11 together with FIGS. 1 and 8, a battery module 500 includes a plurality of unit modules 110 and a connection member 510 to electrically connect the unit modules 110 to one another.

The unit modules 110 are arranged in a matrix of 5×5. Electrode terminals having the same polarity are arranged in the column direction (the vertical direction), and electrode terminals having different polarities are arranged in the row direction (the horizontal direction).

The connection member 510 is formed of a conductive plate. The connection member 510 includes a first connection member 511 to electrically connect the first column of the unit modules 110 to one another at the front of the battery module 500, a second connection member 512 to electrically connect the second column and the third column of the unit modules 110 to one another at the front of the battery module 500, the second connection member 512 having two extensions extending in the row direction, and a third connection member 513 to electrically connect the fourth column and the fifth column of the unit modules 110 to one another at the front of the battery module 500, the third connection member 513 having two extensions extending in the row direction.

As shown in FIG. 11, connection members arranged in the reverse direction are mounted to the rear of the battery module 500 (for easy understanding, the connection members are shown in a state in which the connection members are separated from the battery module in the drawing).

Figure 12:
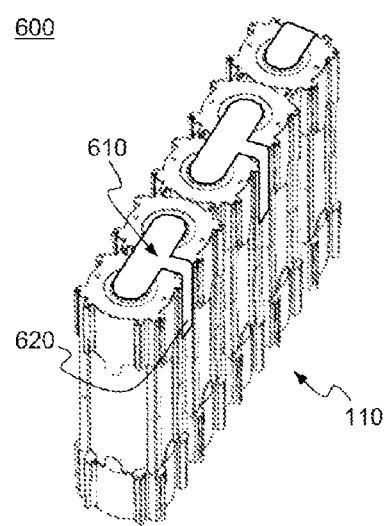
FIG. 12 is a perspective view showing a battery module according to a further embodiment of the present invention.

FIG. 12 is a perspective view showing a battery module according to a further embodiment of the present invention.

A battery module 600 is configured to have a structure including a matrix of 5×1. A connection member 610 connects a first column and a second column of unit modules to each other, and another connection member 610 connects a third column and a fourth column of unit modules to each other. Each of the connection members 610 includes a voltage detection terminal 620 bent in the lateral direction of the unit modules.

Also, a conductive wire (not shown) may be connected to each of the connection members to constitute an external input and output terminal.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A battery cell holder configured so that a single cylindrical battery cell is mounted therein, the battery cell holder comprising:
    an upper cover comprising a first main body to cover an upper part of the battery cell in a state in which a first electrode terminal of the battery cell is exposed and at least one first extension fastening part extending downward from the first main body; and
    a lower cover comprising a second main body to cover a lower part of the battery cell in a state in which a second electrode terminal of the battery cell having a polarity opposite to that of the first electrode terminal is exposed and at least one second extension fastening part extending upward from the second main body, wherein
    an end of the at least one first extension fastening part and an end of the at least one second extension fastening part are fastened to each other in a state in which the battery cell is mounted in the battery cell holder,
    the upper cover and/or the lower cover is provided at an outer side thereof with at least one side fastening part and a coolant flow channel is formed at a space defined between side fastening parts, by which a side of the battery cell holder is fastened to that of another battery cell holder,
    the at least one side fastening part is configured to have a sliding fastening type groove structure formed in a longitudinal direction of the battery cell holder, and
    the sliding fastening type groove structure comprises a hook and a depressed groove corresponding to the hook in a sectional shape perpendicular to the longitudinal direction.

2. The battery cell holder according to claim 1, wherein the first main body and/or the second main body is configured to have an inner structure corresponding to an outer shape of the cylindrical battery cell.

3. The battery cell holder according to claim 1, wherein the first main body is provided at an upper end thereof with an opening, through which the corresponding first electrode terminal of the battery cell is exposed, the second main body is provided at a lower end thereof with an opening, through which the corresponding second electrode terminal of the battery cell is exposed, and each of the openings has an outer circumferential part protruding from the corresponding first electrode terminal or the corresponding second electrode terminal by a predetermined thickness.

4. The battery cell holder according to claim 3, wherein each of the openings is circular in a planar shape.

5. The battery cell holder according to claim 3, wherein the outer circumferential part of each of the openings has a thickness of 0.1 to 1 mm.

6. The battery cell holder according to claim 1, wherein the at least one first extension fastening part comprises two or more first extension fastening parts symmetric with respect to a central axis of the battery cell holder, and the at least one second extension fastening part comprises two or more second extension fastening parts symmetric with respect to the central axis of the battery cell holder.

7. The battery cell holder according to claim 1, wherein the at least one first extension fastening part comprises even-numbered first extension fastening parts, and the at least one second extension fastening part comprises even-numbered second extension fastening parts.

8. The battery cell holder according to claim 1, wherein one of the first and second extension fastening parts has a coupling protrusion, and the other of the first and second extension fastening parts has a coupling groove corresponding to the coupling protrusion.

9. The battery cell holder according to claim 8, wherein the fastening protrusion is fastened into the fastening groove in a forced fitting fashion.

10. The battery cell holder according to claim 1, wherein the depressed groove is formed inside at a bent portion of the hook.

11. The battery cell holder according to claim 1, wherein, when each of the extension fastening parts comprises quadruple-numbered extension fastening parts, bent portions of the hooks are alternately arranged by two units.

12. The battery cell holder according to claim 11, wherein, when the bent portions of the hooks at a pair of extension fastening parts are inwardly directed to each other, the bent portions of the hooks at neighboring extension fastening parts are outwardly directed from each other.

13. The battery cell holder according to claim 1, wherein the side fastening parts are formed at the upper cover and the lower cover at opposite sides of an imaginary extension line of the extension fastening parts.

14. A unit module comprising a battery cell holder according to claim 1 and a cylindrical battery cell mounted in the battery cell holder.

15. A battery module comprising two or more unit modules according to claim 14 and at least one connection member to electrically connect the unit modules to each other.

16. The battery module according to claim 15, wherein the battery module is configured to have a structure in which the unit modules are arranged in at least two rows and/or in at least two columns.

17. The battery module according to claim 15, wherein the battery module has a coolant flow channel formed among neighboring unit modules at a space defined between side fastening parts in a longitudinal direction of battery cells.

18. The battery module according to claim 15, wherein the battery module has a coolant flow channel formed among neighboring unit modules at a space defined between extension fastening parts in a lateral direction of battery cells.

19. The battery module according to claim 15, wherein the battery module is configured to have a structure in which the unit modules are arranged in a matrix of 5×5, in which electrode terminals having the same polarity are arranged in a column direction (vertical direction), and electrode terminals having different polarities are arranged in a row direction (horizontal direction).

20. The battery module according to claim 15, wherein the at least one connection member is formed of a conductive plate.

21. The battery module according to claim 19, wherein the at least one connection member comprises a first connection member to electrically connect a first column of the unit modules to one another at a front of the battery module, a second connection member to electrically connect a second column and a third column of the unit modules to one another at the front of the battery module, the second connection member having at least one extension extending in a row direction, and a third connection member to electrically connect a fourth column and a fifth column of the unit modules to one another at the front of the battery module, the third connection member having at least one extension extending in the row direction.

22. The battery module according to claim 15, wherein the at least one connection member comprises a voltage detection terminal bent in a lateral direction of the unit modules.

23. The battery module according to claim 20, wherein a conductive wire is connected to the conductive plate to constitute an external input and output terminal.

24. A device comprising a battery module according to claim 15 as a power source.

25. The device according to claim 24, wherein the device is an electric vehicle, a hybrid electric vehicle, a plug-in hybrid electric vehicle, an electric motorcycle, or a power storage device.

* * * * *